June 3, 1969   M. ELPERN   3,447,862

LIGHT VALVE SYSTEM

Filed Aug. 19, 1966

INVENTOR

MARLIN ELPERN

BY Robb & Robb

ATTORNEYS

United States Patent Office 3,447,862
Patented June 3, 1969

3,447,862
LIGHT VALVE SYSTEM
Marlin Elpern, 8217 Greymont St.,
Hyattsville, Md. 20785
Filed Aug. 19, 1966, Ser. No. 573,562
Int. Cl. G02f 1/32
U.S. Cl. 350—269                                    14 Claims

ABSTRACT OF THE DISCLOSURE

This invention encompasses a light valve consisting of an expandable coil spring, actuated either by a magnetic field or by mechanical means.

---

The present invention relates to light valve systems for controlling the intensity of light for direct observation or serving to actuate or energize various light responsive devices such as photo-links, and for other analogous purposes.

Currently known techniques for electrically controlling the intensity of a light beam utilize the so-called "Kerr effect," the "Farraday effect," the "Stark effect" and other principles, which mostly depend upon the bifringent properties of special materials, as evidenced by prior U.S. patents granted for method and/or apparatus utilizing these principles, of which Patent No. 1,835,612, granted Dec. 8, 1931, and the references cited therein, are typical examples.

The present invention, however, utilizes the simple principle of diffusion through a simple flexible and resilient coil spring valve, preferably formed from ferro-magnetic material and which is contractible and distendable to variably control a beam of light when the spring valve is interposed in the path of the beam. When such a spring valve is contracted to its maximum extent, preferably in its rest or normal state, with the individual coils of the spring contacting or closely juxtaposed with relation to each other, the spring valve is effectively closed and completely obstructs passage of the light beam past the same, while being capable of passing a controllable amount of light when the coil spring is distended by a mechanical, magnetic or other suitable force applied to the coil spring while one end of the spring is held fixed, to separate the individual coils of the springs to any extent desired.

Accordingly, it is the primary object of the present invention to provide an effective means for modulating the intensity of a light beam.

A further object of the invention is to provide a simple and effective light switch or valve for selectively blocking or passing a light beam.

A still further object of the invention is to provide a light valve as aforementioned which readily lends itself to miniaturiaztion on the order of a microminiature structure.

Another object of the invention is to provide a light valve which is electro-magnetically operable responsive to low voltage and power.

Yet a further object is to provide an improved light valve which simultaneously satisfies the essential requirements of minimum friction, low operating power or energy, the passing of light in proportion to the mechanical motion involved, rapid and controllable as to time to return to a rest state, as well being subject to controllable response time, and simplicity of construction, with the consequent low cost of manufacture.

Other and further objects and advantages of my invention will be hereinafter described or will become apparent from the following details description and the accompanying drawings.

In the drawings.

Like reference characters designate corresponding parts in the several figures of the drawings.

Figure 1:
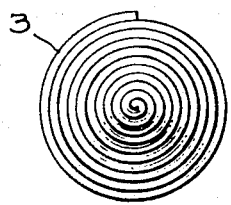
FIG. 1 is a view in front elevation of one form of light valve by which the intensity of a light beam can be controlled by a system embodying my invention.
Figure 2:
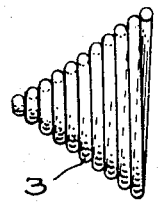
FIG. 2 is a view in side elevation of the light valve of FIG. 1, with the valve being shown in a closed condition when completely obstructing the passing of light thereby.
Figure 3:
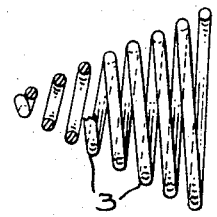
FIG. 3 is a view in side elevation, with the light valve being shown in an axially distended condition when permitting the passing of light thereby, with a portion of the valve broken away and shown in cross section.
Figure 4:
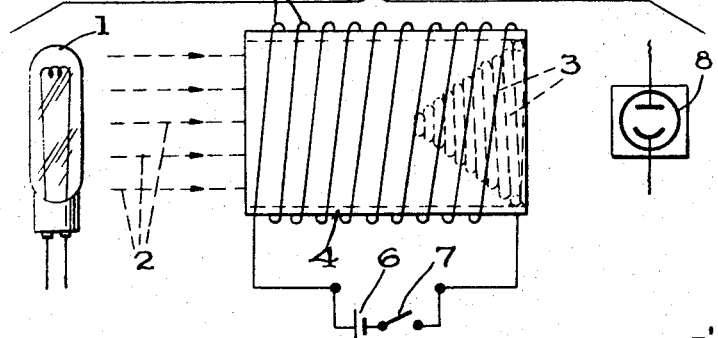
FIG. 4 is a diagrammatic view of a light valve system embodying the light valve of FIGS. 1 to 3, with the light valve closed and in a normal state of rest.
Figure 5:
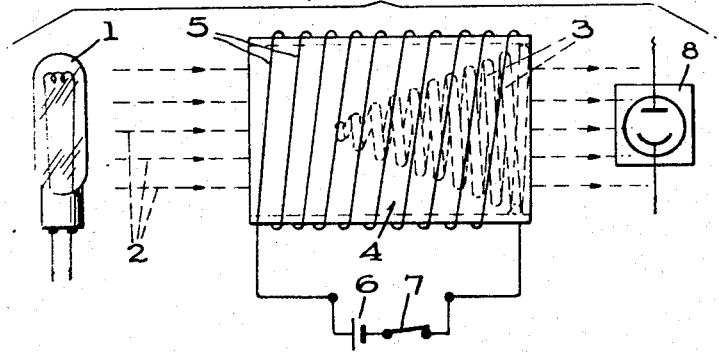
FIG. 5 is a diagrammatic view of the system of FIG. 4, with the light valve distended in response to an electromagnetic field as produced by a solenoid component of the system.

Referring first to FIGS. 1 to 5 inclusive, it will be seen that the light valve system essentially comprises a light source 1, such as an electric lamp or any other suitable component which emits a beam 2 of light, as represented in FIGS. 4 and 5 by the broken lines and arrows, and a light valve 3 toward which the light beam 2 is directed. In this arrangement, the light valve 3 has the form of a flexible coil spring of conical shape preferably composed of ferro-magnetic material, and the individual coils of the spring are so arranged that when the spring is fully contracted, as in FIGS. 2 and 4, the coils lie closely adjacent or in contact with each other so as to effectively obstruct the passing of the light beam beyond the spring, while variably controlling the amount of light permitted to pass beyond the spring, in proportion to the spacing of the individual coils thereof, when the spring is axially distended as illustrated in FIGS. 3 and 5. The light valve spring 3 can be of any desired size, and by making it of very fine wire, it can be reduced to micro-miniature size as required for some miniature systems utilizing light-controlled elements. The wire of the spring 3 may be of circular, rectangular or other shape in cross-section, as desired, and may be highly polished or provided with a reflective coating, if desired, to enhance the passing of light beyond the light valve when the spring is in a distended condition. By appropriate selection of materials or alloys of materials of which the spring wire is made, the resiliency of the spring may be varied according to the required contraction and distention response times if this is critical or important under certain conditions of use. In the form shown in FIGS. 1 to 5, the light valve spring is normally contracted fully when in a state of rest, but this is not essential in all cases, since it may under some conditions be desirable to have the spring partly or fully distended when in a state of rest.

According to the system illustrated in FIGS. 4 and 5, control of the light valve 3 is achieved by electro-magnetic means, basically comprising an open-ended solenoid 4 having a winding 5 thereon which, when energized by any suitable source of power, such as a battery 6, will produce a magnetic field of sufficient strength to cause axial distention of the light valve spring 3 when the later is disposed in the magnetic field and one end of the spring is held fixed or anchored. As illustrated in the drawing, the spring is disposed within and toward one end of the solenoid, with the large end of the spring being secured or anchored thereto in any suitable manner, while the remainder of the spring is free to move axially within the solenoid through which the light beam 2 passes, in response to energization and deenergization of the solenoid under the control of a switch 7 or other appropriate regulator in the power circuit. Instead of being energized by a battery, the solenoid may be operated by any suitable source of power, either variable or constant, and very little power or energy is needed to control the light valve 3, especially when utilized in a miniature size.

Under certain conditions of use, the light beam 2, as controlled by the light valve 3, can function like a blinker for direct visual observation on passing by the valve, but there are many other applications of the system to uses where the light beam acts upon a light responsive device, as designated at 8 in FIGS. 4 and 5. While the component 8 is diagrammatically illustrated in the drawing as a photo-cell, it is to be understood that other light responsive devices and/or systems can be employed in lieu of and/or along with the photo-cell, including photo-link switches and systems, oscillator systems, computers, television screens, travelling or animated signs, and many others, to name only a few.

It will be readily apparent that the light valve aforementioned will operate effectively in the atmosphere, as well as in gaseous mediums, liquid mediums, and even in a vacuum.

Figure 9:
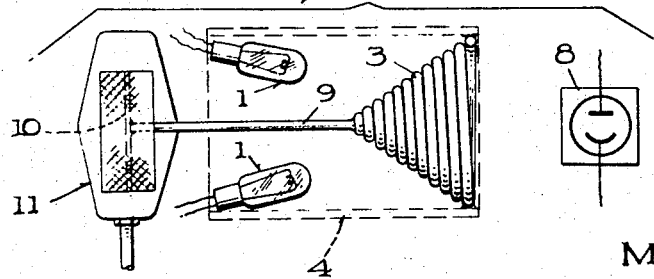
FIG. 9 is a view of a modified light valve system in which the light valve is mechanically controlled by an audio-responsive device such as a microphone diaphragm.

FIG. 9 illustrates a modified arrangement wherein the light valve 3 is mechanically controlled as by means of a relatively stiff wire or link 9 which is connected at one end to the free end of the light valve spring and fixed at its other end to a moveable element such as the diaphragm 10 of an audio-responsive microphone 11, for example. In this example, the light beam may be produced by two light sources 1, 1, for convenience, with the light valve 3 interposed in the path of the light beam between the light source or sources and the light responsive device 8.

Figures 6, 7:
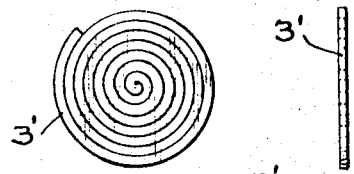
FIG. 6 is a view in front elevation of a modified form of light valve shown in its normally closed light-obstructing state of rest.
FIG. 7 is a view in side elevation of the light valve of FIG. 6.
Figure 8:
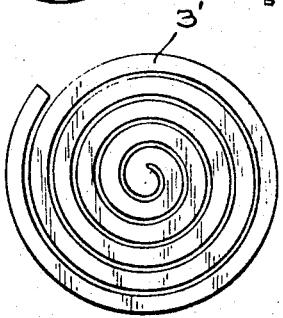
FIG. 8 is a view in front elevation on an enlarged scale of the light valve of FIG. 6 in an axially distended light-passing condition.

A modified form of light valve, designated 3', is shown in FIGS. 6 to 8, inclusive, wherein the valve has the form of a resilient spiral ribbon as formed from a flat sheet or disc, whose individual coils or turns are contiguous to each other when contracted into a common flat plane, as shown in FIGS. 6 and 7, but the individual coils being variably spaced apart when the valve is axially distended while one end of the spring coil is held fixed. This type of light valve may be substituted for the conical light valve spring 3 previously described, and functions in the same general manner when operated either electro-magnetically or mechanically or otherwise to control a light beam. Such a light valve as 3' can also be in a flat or fully contracted condition when in its normal state of rest, or if preferred, can be either partially or fully distended when in a normal state of rest, according to the conditions of use of the light valve system.

Instead of only a single light valve, it can be used in multiples and/or banks wherein the individual light valves are operable in any suitable order, combination or other relation.

I claim:

1. A light valve system for controlling a light responsive device, comprising a light source, a light responsive device disposed in the light path emanating from said light source, and a light valve interposed in the light path between the light source and the light responsive device, said light valve having the form of a flexible coil spring, with the respective coils of the spring being moveable into and out of contiguous relation with each other responsive to contraction and distension of the spring, and means for controlling contraction and distension of the spring aforesaid to vary the spacing of the individual coils thereof and thereby vary the intensity of the portion of the light beam passing through the spring to the light responsive device such that substantially all of the varying light incident on the light responsive device passes through the spring.

2. A light valve system as defined in claim 1, wherein the light valve spring is disposed in the light beam with its central axis substantially parallel to and coinciding with the axis of the light beam.

3. A light valve system as defined in claim 1, wherein the light valve spring has a conical form, with the individual coils of the spring being of progressively increasing diameter from end-to-end and terminating in a closed coil at its small end.

4. A light valve system as defined in claim 1, wherein the light valve spring has a spiral ribbon-like form, with the respective coils lying closely adjacent to one another and in a common plane when in a condition of maximum contraction.

5. A light valve system as defined in claim 1, wherein the light valve spring is of such resiliency as to be fully contracted when in a state of rest to completely obstruct passage of the light beam past the same.

6. A light valve system as defined in claim 1, wherein the light valve spring is made of ferro-magnetic material, and the means for controlling the contraction and distention of the spring is in the form of electro-magnetic means operatively acting on the spring.

7. A light valve system as defined in claim 1, wherein the light valve spring is made of ferro-magnetic material, and the means for controlling the contraction and distention of the spring is in the form of electro-magnetic means operatively acting on the spring in at least one direction.

8. A light valve system as defined in claim 1, wherein the light valve spring is made of ferro-magnetic material, and the means for controlling the contraction and distention of the spring is in the form of electro-magnetic means operatively acting on the spring in a direction tending to distend the spring.

9. A light valve system as defined in claim 1, wherein the light valve spring is made of ferro-magnetic material, and the means for controlling the contraction and distention of the spring is in the form of electro-magnetic means operatively acting on the spring, said electro-magnetic means comprising an electrically energizable solenoid.

10. A light valve system as defined in claim 1, wherein the light valve spring is made of ferro-magnetic material, and the means for controlling the contraction and distention of the spring is in the form of electro-magnetic means operatively acting on the spring, said electro-magnetic means including an open-ended electrically energizable solenoid coil through which the light beam is directed from the light source, with the light valve spring disposed within the solenoid coil and having one end of the valve spring fixed thereto to prevent axial movement of said fixed end, with the remainder of the spring being free for axial movement responsive to the magnetic field produced by the solenoid coil when the latter is energized.

11. A light valve system as defined in claim 1, wherein the means for controlling contraction and distention of the valve spring includes mechanical actuator means.

12. A light valve system as defined in claim 1, wherein the means for controlling contraction and distention of the valve spring includes mechanical actuator means which is audio responsive.

13. A light valve system for controlling a light beam, comprising a light source emitting a beam of light, a light valve interposed in the path of the light beam aforesaid and serving to control the beam, said light valve having the form of a resilient coil spring having its individual coils moveable into and out of contiguous relation responsive to contraction and distention of the spring, and means for controlling contraction and distention of the spring to vary the spacing of the individual coils thereof and thereby vary the intensity of the portion of the light beam passing through the spring such that substantially all of the varying light passes through the spring.

14. A light valve system as defined in claim 13, wherein the individual coils of the spring substantially obstruct the light beam when the spring is contracted, while permitting passing of the light beam beyond the spring when it is distended.

References Cited

UNITED STATES PATENTS

| | | |
|---|---|---|
| 125,937 | 4/1872 | Cowles. |
| 1,967,018 | 7/1934 | Bohner _____ 250—231 XR |
| 2,325,884 | 8/1943 | Schorn _____ 250—231 XR |
| 2,666,650 | 1/1954 | MacDonell _____ 250—231 XR |

FOREIGN PATENTS

| | | |
|---|---|---|
| 5,502 | 12/1880 | Great Britain. |
| 20,861 | 9/1894 | Great Britain. |

OTHER REFERENCES

Hufnagel et al.: "Aortic Valvular Prostheses," Annals of Surgery, vol. 147, No. 5, May 1958, p. 643.

U.S. Cl. X.R.

250—229, 231; 350—266